United States Patent
Da Palma et al.

(10) Patent No.: US 8,654,940 B2
(45) Date of Patent: *Feb. 18, 2014

(54) DIALECT TRANSLATOR FOR A SPEECH APPLICATION ENVIRONMENT EXTENDED FOR INTERACTIVE TEXT EXCHANGES

(75) Inventors: William V. Da Palma, Coconut Creek, FL (US); Baiju D. Mandalia, Boca Raton, FL (US); Victor S. Moore, Lake City, FL (US); Wendi L. Nusbickel, Boca Raton, FL (US)

(73) Assignee: Nuance Communications, Inc., Burlington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/414,997

(22) Filed: Mar. 8, 2012

(65) Prior Publication Data
US 2012/0173225 A1 Jul. 5, 2012

Related U.S. Application Data

(63) Continuation of application No. 11/613,179, filed on Dec. 19, 2006, now Pat. No. 8,204,182.

(51) Int. Cl.
*H04M 11/00* (2006.01)
(52) U.S. Cl.
USPC .................. 379/93.15; 704/260; 455/466
(58) Field of Classification Search
USPC ............. 379/88.14, 93.15; 704/2, 4, 260, 251
See application file for complete search history.

(56) References Cited

U.S. PATENT DOCUMENTS

| | | | |
|---|---|---|---|
| 5,745,904 A | 4/1998 | King et al. | |
| 6,735,287 B2 | 5/2004 | Vishik et al. | |
| 6,795,822 B1* | 9/2004 | Matsumoto et al. | 1/1 |
| 6,816,578 B1* | 11/2004 | Kredo et al. | 379/88.17 |
| 6,895,084 B1 | 5/2005 | Saylor et al. | |
| 7,065,185 B1 | 6/2006 | Koch | |
| 7,136,909 B2 | 11/2006 | Balasuriya | |
| 7,640,233 B2* | 12/2009 | Baartman et al. | 1/1 |
| 7,921,214 B2 | 4/2011 | Da Palma et al. | |
| 7,996,023 B2* | 8/2011 | McGary et al. | 455/466 |
| 8,000,969 B2 | 8/2011 | Da Palma et al. | |
| 8,320,891 B1* | 11/2012 | Delker et al. | 455/414.3 |

(Continued)

FOREIGN PATENT DOCUMENTS

FR 2844127 A1 3/2004

OTHER PUBLICATIONS

"Jabberwacky—About Thoughts—An Artificial Intelligence AI Chatbot, Chatterbot or Chatterbox," 1996-2006 Rollo Carpenter.

(Continued)

*Primary Examiner* — Olisa Anwah

(57) ABSTRACT

The present solution includes a real-time automated communication method. In the method, a real-time communication session can be established between a text exchange client and a speech application. A translation table can be identified that includes multiple entries, each entry including a text exchange item and a corresponding conversational translation item. A text exchange message can be received that was entered into a text exchange client. Content in the text exchange message that matches a text exchange item in the translation table can be substituted with a corresponding conversational item. The translated text exchange message can be sent as input to a voice server. Output from the voice server can be used by the speech application, which performs an automatic programmatic action based upon the output.

21 Claims, 2 Drawing Sheets

(56) References Cited

U.S. PATENT DOCUMENTS

| | | |
|---|---|---|
| 2003/0028380 A1* | 2/2003 | Freeland et al. .............. 704/260 |
| 2003/0211845 A1* | 11/2003 | Lohtia et al. ............... 455/414.3 |
| 2004/0054740 A1 | 3/2004 | Daigle et al. |
| 2004/0267527 A1 | 12/2004 | Creamer et al. |
| 2005/0137875 A1 | 6/2005 | Kim et al. |
| 2007/0116203 A1 | 5/2007 | Allegre |
| 2007/0123280 A1* | 5/2007 | McGary et al. ............... 455/466 |
| 2008/0059152 A1 | 3/2008 | Fridman et al. |
| 2009/0175422 A1* | 7/2009 | Marics et al. .................. 379/45 |

OTHER PUBLICATIONS

Meng et al., "ISIS: An Adaptive, Trilingual Conversational System With Interleaving Interaction and Delegation Dialogs," ACM Transactions on Computer Human Interaction, vol. 11, No. 3, pp. 268-299, Sep. 2004.

Olsson et al., "MEP—A Media Event Platform," Mobile Networks and Applications, Kluwer Academic Publishers, vol. 7, No. 3, pp. 235-244, 2002.

"TodayTranslations, Breaking the Web Barrier," Surfocracy, 2006.

* cited by examiner

DIALECT TRANSLATOR FOR A SPEECH APPLICATION ENVIRONMENT EXTENDED FOR INTERACTIVE TEXT EXCHANGES

RELATED APPLICATIONS

This application is a continuation of, and claims the benefit under 35 U.S.C. §120 of, U.S. patent application Ser. No. 11/613,179 filed Dec. 19, 2006 and entitled "Dialect Translator for a Speech Application Environment Extended for Interactive Text Exchanges," the entire contents of which is incorporated herein by reference.

BACKGROUND

1. Field of the Invention

The present invention relates to the field of automated speech systems and, more particularly, to a dialect translator for a speech application environment that is extended for interactive text exchanges, where the dialect translator dynamically translates text-based input including text exchange slang and emotes into a speech dialect consumable by a voice server.

2. Description of the Related Art

Interactive Voice Response (IVR) systems are often used to provide automated customer service via a voice channel of a communication network. IVR systems permit routine customer requests to be quickly, efficiently, and automatically handled. When a request is non-routine or when a caller has difficulty with the IVR system a transfer can be made from the IVR system to a customer service representative. Even when human interactions are needed, the IVR system can obtain necessary preliminary information, such as an account number and a reason for a call, which can ensure callers are routed to an appropriate human agent and to ensure human-to-human interactive time is minimized. Successful use of IVR systems allows call centers to be minimally manned while customers are provided a high level of service with relatively low periods spent in waiting queues.

IVR systems, especially robust ones having, natural language understanding (NLU) capabilities and/or large context free grammars, represent a huge financial and technological investment. This investment includes costs for purchasing and maintaining IVR infrastructure hardware, IVR infrastructure software, and voice applications executing upon this infrastructure. An additional and significant reoccurring cost can relate to maintaining a sufficient number of voice quality channels to handle anticipated call volumes. Further, each of these channels consumes an available port of a voice server, which has a limited number of costly ports. Each channel also consumes a quantity of bandwidth needed for establishing a voice quality channel between a caller and the IVR system.

One innovative solution for extending an IVR infrastructure to permit text-based interactive services is detailed in co-pending patent application Ser. No. 11/612,996 entitled "Using an Automated Speech Application Environment to Automatically Provide Text-Based Interactive Services," More specifically, the co-pending application teaches that a chat robot object, referred to as a Chatbot, can dynamically convert text received from a text exchange client to input consumable by a voice server and can dynamically convert output from the voice server to text appropriately formatted for the client. From a perspective of the voice server, the text-based interactions with the text exchange client are handled in the same manner and with the same hardware/software that is used to handle voice-based interactions.

Dynamic conversions between a text exchange client, such as a chat client, and an IVR infrastructure are complicated by an existence of a text exchange dialect. That is, a text exchange dialect has evolved that is not easily converted into speech phrases comprehensible or by a standard speech recognition engine or consumable by a standard IVR infrastructure. For example, slang such as "cu l8r" for "see you later" and "brb" for "be right back" is commonly utilized during text exchange communication sessions. Additionally, special character sequences unique to text exchanges, such as emoticons like ;-) and :-0, need to be handled. No known software products exist that dynamically convert text exchange input into input able to be consumed by a voice server, nor do solutions exist that dynamically handle dialect translations for the same purpose.

SUMMARY OR THE INVENTION

A dialect translator that functions as a pre- and post-processor for a speech application environment, where the speech application environment has been extended for text-based interactive services. The speech application environment can include a Chatbot server, which manages chat robot objects or Chatbots. Chatbots can dynamically convert text received from a text exchange client to input consumable by a voice server and to dynamically convert voice markup to text appropriately formatted for the text exchange client. In this environment, the dialect translator normalizes text from a text exchange dialect to standard textual phrases of an associated spoken language, such as English. The dialect translator can also convert textual output derived from output of a voice server into a text exchange dialect expected by a text exchange user.

The present invention can be implemented in accordance with numerous aspects consistent with the material presented herein. For example, one aspect of the present invention can include a real-time automated communication method. In the method, a real-time communication session can be established between a text exchange client, and a speech application. A translation table can be identified that includes multiple entries, each entry including a text exchange item and a corresponding conversational translation item. A text exchange message can be received that was entered into a text exchange client. Content in the text exchange message that matches a text exchange item in the translation table can be substituted with a corresponding conversational item. The text exchange message can be dynamically converted to a voice message consumable by the speech application. The voice message can be conveyed to the speech application, which performs an automatic programmatic action based upon the conveyed voice message.

Another aspect of the present invention can include a method for extending a voice server to add text exchange capabilities. The method can include the steps of establishing a real-tune text exchange connection between a text exchange client and a Chatbot server and establishing a real-time voice connection between the Chatbot server and a speech application. An interactive dialogue can be conducted over the text exchange connection and the voice connection between the text exchange client and the speech application. During the interactive dialogue, text exchange interactions can be dynamically and automatically converted to voice interactions before being conveyed from the text exchange client to the speech application. Text exchange specific language in the text exchange interactions can be dynamically translated into conversational language that is included in the voice interactions.

Still another aspect of the present invention can include a system for providing text exchange services using a speech application environment. The system can include a text exchange client, a speech application environment, a Chatbot server, and a dialect translator. The text exchange client can send and receive real-time text exchanges over a text exchange channel. The speech application environment can execute an automated speech response application that permits users to interact in real-time over a voice channel. The Chatbot server can establish a communication session involving the text exchange client and the automated speech response system. The Chatbot server can dynamically convert messages between a voice modality and a text exchange modality during the communication session in a manner transparent to the text exchange client and the automated speech response application. The dialect translator can dynamically detect text exchange specific language contained in message from the text exchange client. Detected language can be converted from the text exchange language into corresponding conversational language. The converted messages received by the automated speech response system can include the conversational content.

It should be noted that various aspects of the invention can be implemented as a program for controlling computing equipment to implement the functions described herein, or a program for enabling computing equipment to perform processes corresponding to the steps disclosed herein. This program may be provided by storing the program in a magnetic disk, an optical disk, a semiconductor memory, any other recording medium, or can also be provided as a digitally encoded signal conveyed via a carrier wave. The described program can be a single program or can be implemented as multiple subprograms, each of which interact within a single computing device or interact in a distributed fashion across a network space.

The method detailed herein can also be a method performed at least in part by a service agent and/or a machine manipulated by a service agent in response to a service request.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
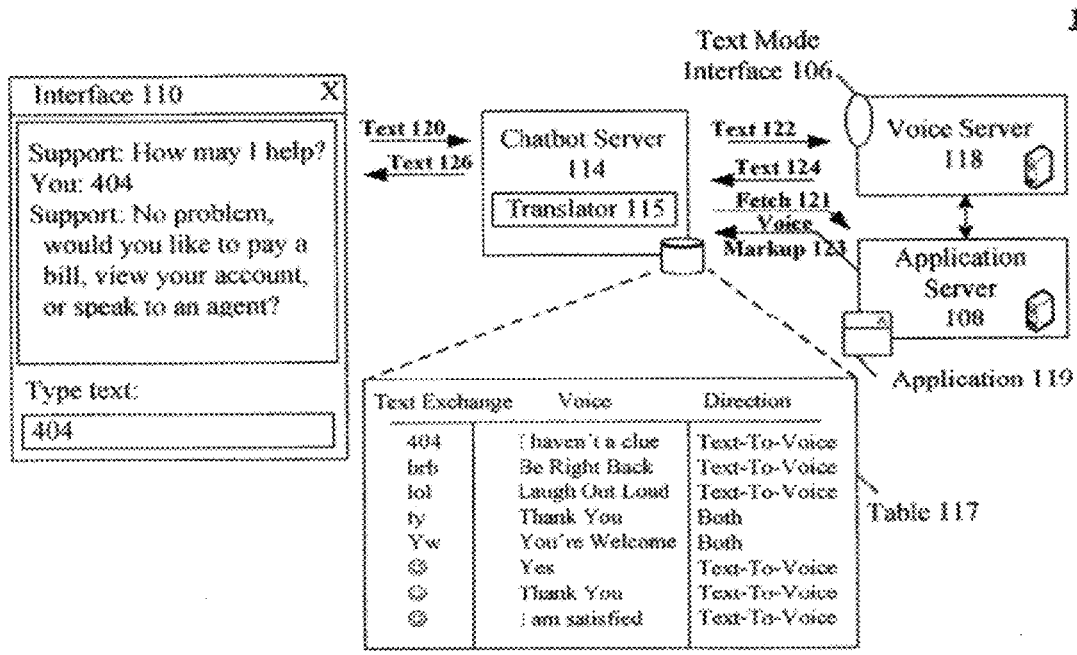
FIG. 1 is a schematic diagram of a system that bidirectionally translates text exchange language during dynamic interactions between a text exchange client and a speech application in accordance with an embodiment for the inventive arrangements disclosed herein.

FIG. 1 is a schematic diagram of a system 100 that bidirectionally translates text exchange language during dynamic interactions between a text exchange client 110 and a speech application 119. System 100 permits automated interactions between a text exchange client 110 and a speech-enabled application 119.

The speech-enabled application 119 can be a VoiceXML, application, such as an application for an Interactive Voice Response System (IVR) often deployed at contact centers. The text exchange client interface 110 can be an interface for any type of text exchange communications, such as Instant Message (IM) communications, chat communications, text-messaging using SAMETIME, TRILLIAN, YAHOO! MESSENGER, and the like.

The voice server 118, like most voice servers, can include a text mode interface 106, which is typically used by developers, system maintainers, and/or trainers of a speech recognition engine. For example, a set of proprietary, restricted, or standardized (e.g., MRCPv2 INTERPRET) Application Program Interfaces (APIs) can be used for the interface 106. This set of APIs, which are typically not available or accessible within a production environment, can be enabled to create a text input channel that consumes considerably fewer computing resources that a voice channel, which is typically established with the voice server 118 operating in a production environment. In most cases, the text mode interface 106 is present, but dormant, within production voice servers 118. Interface 106 can be enabled for text based interactions with Chatbot server.

Use of interface 106 occurs in a manner transparent to the application server 108 and therefore has no affect on application 119. That is, application 119 and application server 108 remain unaware that the voice server 118 is processing text input via interface 106, as opposed to voice input. The output produced by voice server 118 and sent to Chatbot server 114 can be the same in either case. Further, the output produced by the application server 108 and sent to the Chatbot server 114 is the same. Thus, multiple communication sessions, some being text-based sessions that use interface 106 and others being voice based sessions can be concurrently handled by application server 108. System 110 can be implemented without infrastructure changes to application server 108 and without changes to voice server 118 assuming interface 106 is present) and without changing code of speed enabled applications 119. This is true, even though the application 119 may lack explicitly coded support for text exchange interactions and would be unable to support such interactions without the disclosed invention. Further, the text exchange interface 110 can be any off-the-shelf text exchange software, which needs not be modified to operate as shown in system 100.

In system 100, the Chatbot server 114 can teach 121 voice markup 123 associated with a speech enabled application 119, which it executes. The Chatbot server 114 can also relay textual input 120 from interface 110 to send text 122 consumable by voice server 118 via interface 106. Before sending the text 120, the translator 115 in Chatbot server 114 can check text 120 for slang or shorthand, which the voice server 118 will have trouble with. Any entries found in table 117 can be dynamically translated, which results in text 122. The voice server 118 can match the input 122 against a recognition grammar and generate text output 124 for the Chatbot server 114.

The Chatbot server 114 can use this output 124 when it executes the application. The application 119 processes this output, which can produce a responsive output, typically in a form of a Voice markup segment, such as VoiceXML (which can further employ the use of the W3C Speech Synthesis Markup Language or SSML). When performing text exchange operations, normal speech synthesis operations performed by the voice server 118 can be bypassed. The Chatbot server 114 can dynamically convert the responsive output from the markup into textual output 126, which interface 110 handles. For example, textual content contained between markup tags can be extracted from the application 119 markup (i.e., the markup tags can be omitted) and included within a text 126 message. Before text 126 is sent, however, the translator 115 can convert automatically generated text to text exchange language (i.e., slang, shorthand, emotes) based upon table 117.

As noted above, the Chatbot server 114 is capable of handling dynamic translations between a text exchange dialect and speaking dialect using a translator 115. The translator 115 can include the translation table 117 that relates text exchange phrases with voice phrases. Table 117 can include entries for emoticons, special character sequences, text exchange slang, and the like. Table 117 can permit users to add, edit, and delete entries. Additionally, each table 117 entry can be associated with a translation direction. Translation directions include bidirectional, from text exchange to voice only, and from voice to text exchange only.

For example, table 117 shows an entry of "404" associated with "I haven't a clue" that is to be translated unidirectionally from text exchange to voice only. Bidirectional entries in table 117 include "Ty" associated with "Thank You" and "Yw" associated with "You're welcome."

In one arrangement, entries in table 117 are permitted to be overloaded, where a correct entry for a situation (or dialogue context) is utilized. For example, the text exchange input of ":-)" can translate into voice phrases of "yes", "thank you", or "I am satisfied." The first entry can be a default translation. Subsequent translations can be used in order when voice server 118 fails to understand a translated response.

For example, a voice server received response of "Yes" translated from ":-)" may result in voice server 118 generating an out-of-context response (e.g., "I do not understand, please try again.") Instead of sending this out-of-context response to interface 110, a next translation (if available) can be automatically provided to the voice server 118. For example, "Thank you" can be provided. If this is not understood, then "I am satisfied" can be provided. Only after none of the translations are accepted by the voice server 118, will an out-of-context response be sent to interface 110. Appreciably, neither the chat server 114 nor the interface 110 need be aware of contextually permitted entries for a given dialogue context (of application 119) for this translation overloading capability to be utilized, which can be significant in order for system 100 to operate in a manner transparent to server 118.

Figure 2:
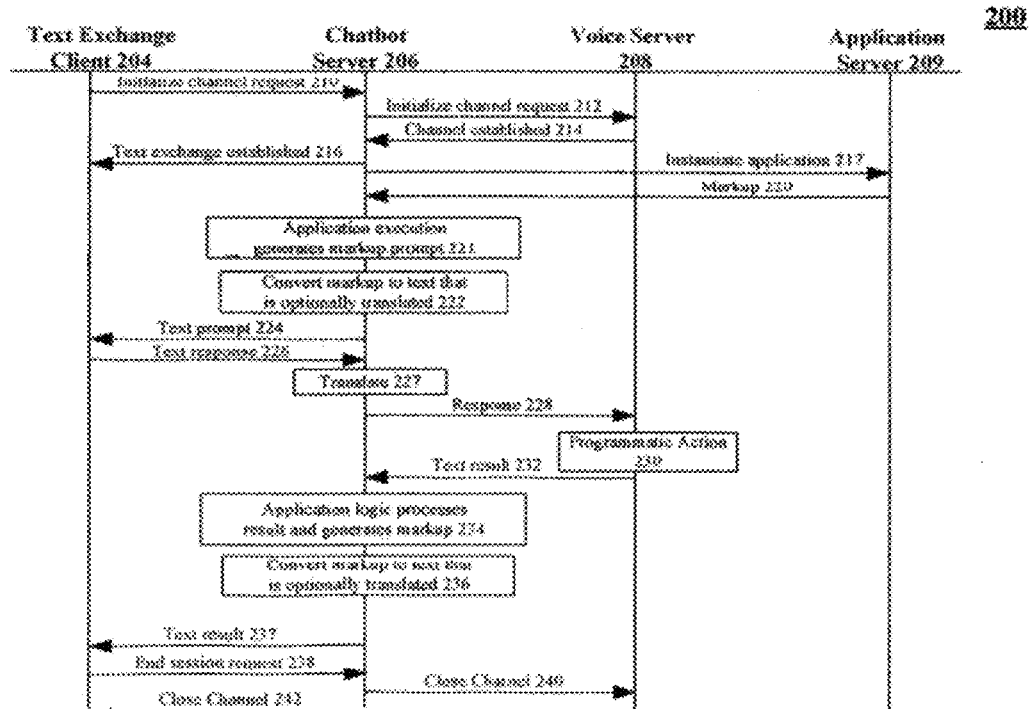
FIG. 2 is a process now diagram showing interactions between a text exchange client, a Chatbot server, a voice server, and an application server in accordance with an embodiment for the inventive arrangements disclosed herein.

FIG. 2 is a process flow diagram 200 showing interactions between a text exchange client 204, a Chatbot server 206, a voice server 208, and an application server 209 in accordance with an embodiment of the inventive arrangements disclosed herein.

The voice server 208 can include a text input API, which is typically used by developers, system maintainers, and/or trainers of a speech recognition engine. This set of APIs, which are typically not available or accessible within a production environment, can be enabled to permit the voice server 208 to directly consume text, which requires considerably fewer computing resources than those needed to process voice input, which server 208 typically receives.

As shown, client 204 can send a request 210 to Chatbot server 206 to initialize a text modality channel. Chatbot server 206 can send a channel initialization message 212 to voice server 208, to establish a session. Server 208 can positively respond causing a channel 214 to be established between servers 206 and 208. Chatbot server 206 can then establish the requested text channel 216 with client 204. After step 216, the Chatbot server 206 can send a request 217 to application server 209, which causes a speech enabled application to be instantiated. That is application markup 220 can be conveyed to Chatbot server 206 for execution.

Application initiated prompt 221 can occur, when the ChatBot Server 206 executes the speech enabled application 119. Server 206 can convert 222 markup provided by application 119 into pure text, represented by text prompt 224, which is sent to client 204. For example, prompt 221 can be written in markup and can include:

<prompt> text context </prompt>.

The converting 222 can extract the text context (omitting the markup tags). The text content can be compared against a translation dictionary. Matching context can be dynamically translated. For example, "Thank You" earl be translated into "ty," which can be conveyed in prompt 224 to client 204.

Client 204 can respond 226 to the prompt via the text channel. Chatbot server 206 can translate 227 the response 226 to a response 228, which is sent to voice server 208. The translation only occurs when a text exchange phrase in a translation dictionary corresponds to a voice phase. For example, "l8r" in text exchange dialect can be translated to "later" or "exit program" in a dialect understood by voice server 208. The voice server 208 can match response 228 against a speech grammar via programmatic action 230, which results in text result 232. The voice server 208 can convey text result 232 to the Chatbot server 206. Chatbot server 206 uses this output 232 when it executes the application logic 243 of executing Application 119, which results in markup being generated. The Chatbot server 206 can convert 236 textual content contained within generated markup into a text result 237. The text result 237 can include text exchange specific translations (i.e. normal English words and/or phrases can be translated into text exchange slang or emotes) can be handled by the Chatbot server 206.

Interactions can continue in this fashion until client 204 sends a request 238 to end the communication session. Chatbot server 206 can responsively close 240 the channel between it and voice server 208. The Chatbot server 206 can also close 242 the text exchange channel between it and client 204, at which point the communication session is terminated.

Figure 3:
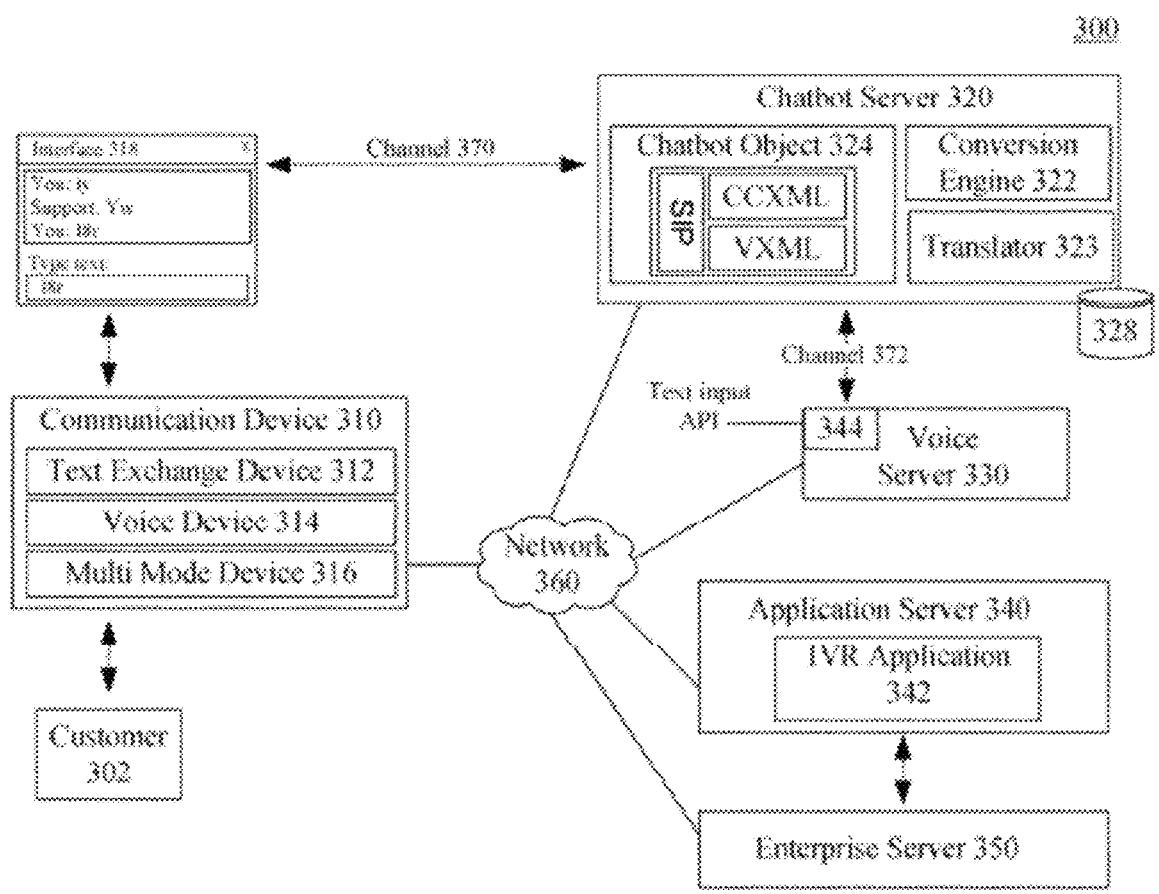
FIG. 3 is a schematic diagram of a system for providing text exchange services with dynamic, dialect translations using a Chatbot server in accordance with an embodiment for the inventive arrangements disclosed herein.

FIG. 3 is a schematic diagram of a system for providing text exchange services with dynamic dialect translations using a Chatbot server 320 in accordance with an embodiment for the inventive arrangements disclosed herein. The translator 323 can correspond to translator 115 of system 100 and can be associated with a translation table (not shown).

The system can include a network 360, which communicatively links communication device 310, Chatbot server 320, voice server 330, application server 340, and enterprise server 350. Network 360 can include any of a variety of components, wired and/or wireless, that together permit digitally encoded information contained within carrier waves to be conveyed from any communicatively linked component to any other communicatively linked component.

The communication device 310 can be any communication device linking a customer 302 to network 360. Devices 310 can include, fir example, mobile telephones, line-based phones, computers, notebooks, computing tablets, personal data assistants (PDAs), wearable computing devices, entertainment systems, interactive media devices, and the like. Specific categories of devices 310 include a text exchange device 312, a voice communication device 314, and a multi mode device 316.

A text exchange device 312 is a computing device capable of real-time interactive text exchanges. These text exchanges include online chatting, instant messaging, and text messaging. A communication device 314 can be any device capable of real-time voice communication over network 360. This includes VoIP based communications, traditional circuit switched communications, two-way radio communications, and the like. A multi mode device 316 is a device capable of engaging in text exchanges and in voice communications. Some multi mode devices 316 are restricted to one mode of communication at a time, while others are able to communicate across multiple modes concurrently.

When performing text exchanges, device 310 can use an interlace 318. The interface 318 can show a running textual dialogue and can include a section to enter new text. Interface 318 can be an interface for an instant messaging client, a chat client, and/or a text-messaging client.

Chatbot server 320 can be as VoiceXML server or equivalent device that dynamically converts text exchange messages from device 310 to messages consumable by voice server 330. Use of a text input API 344, which lets voice server 330 accept text, may permit text from device 310 to be directly consumed by voice server 330. Chatbot server 320 can also dynamically convert output from voice server 330 to output consumable by the speech application, and then making it presentable within interface 318.

For each managed communication session, the Chatbot server 320 can instantiate a Chatbot object 324. The Chatbot object 324 can include a SIP servlet and one or more interpreters, such as a Call Control Extensible Markup Language (CCXML) interpreter, a Voice Extensible Markup Language (VoiceXML) interpreter, an Extensible Hypertext Markup Language (XML) plus voice profiles (X+V) interpreter, a Speech Application Language Tags (SALT) interpreter, a Media Resource Control Protocol (MCRP) interpreter, a customized markup interpreter, and the like. The SIP servlet coin map incoming SIP requests to appropriate interpreters.

A communication session handled by Chatbot object 324 can involve multiple different communication channels, such as channel 370 and channel 372. Channel 370 can be a communication channel established between Chatbot server 320 and device 310. Channel 372 can be a communication channel established between Chatbot server 320 and voice server 330. Appreciably, application server 340 is not aware of a communication modality and channel type that a customer 302 uses to communicate with server 320. A special text input API 344 can be used to permit voice server 330 to directly consume textual input provided by Chatbot server 320.

The conversion engine 322 of server 320 can perform any necessary conversions to adapt output mom text exchange device 312 to input consumable by voice server 330. Typically, no significant conversions are necessary for text consumed by the voice server 330, which provides access to text mode interaction functions via API 344. Appreciably, text mode interaction functions are typically used by developers during a testing and development stage, but are being used here at runtime to permit the voice server 330 to directly handle text. For example, the Internet Engineering Task Force (IETF) standard Media Resource Control Protocol version 2 (MRCPv2) contains a text mode interpretation function called INTERPRET for the Speech Recognizer Resource, which would permit the voice server 330 to directly handle text.

The translator 323 of server 320 can perform translations between a text exchange dialect and a voice dialect more easily understood by IVR application 342. For example, phrases, emotes, and special characters and/or their corresponding phrases can be automatically detected and substituted for one another during a communication session. For example, text exchange expression entered in interface 318 of "ty" can be converted by translator 323 into "thank you," which is conveyed over channel 372 in a voice format. Further, the translator 323 can detect an application 342 generated phase of "You are welcome," can match this phrase to a corresponding text exchange phase of "Yw," which is conveyed over channel 370 and presented in interface 318.

The application server 340 will typically generate voice markup output, such as VoiceXML output, which a voice server 330 converts to audio output. The conversion engine 322 can extract text content from the voice markup and can convey the extracted text to communication device 310 over channel 370.

Application server 340 can be an application server that utilizes modular components of a standardized runtime platform. The application server 340 can represent a middleware server of a multi-tier environment. The runtime platform can provide functionality for developing distributed, multi-tier, Web-based applications. The runtime platform can also include a standard set of services, application programming interfaces, and protocols. That is, the runtime platform can permit a developer to create an enterprise application that is extensible and portable between multiple platforms. The runtime platform can include a collection of related technology specifications that describe required application program interfaces (APIs) and policies for compliance.

In one embodiment, the runtime platform can be a JAVA 2 PLATFORM ENTERPRISE EDITION (J2EE) software platform. Accordingly, the application server 340 can be a J2EE compliant application server, such as a WEBSPHERE application server from International Business Machines Corporation of Armonk, N.Y., a BEA WEBLOGIC application server from BEA Systems, Inc. of San Jose, Calif., a JBOSS application server from JBoss, Inc. of Atlanta, Ga., a JOnAS application server from the ObjectWeb Consortium, and the like. The runtime platform is not to be construed as limited in this regard and other software platforms, such as the .NET software platform, are contemplated herein.

The IVR application 342 can be an application that permits callers to interact and receive information from a database of an enterprise server 350. Access to the voiceXML server 320 (which has been extended for Chatbot 320) can accept user input using touch-tone signals, voice input, and text input. The IVR application 342 can provide information to the user in the form of a single VoiceXML application that can be used by any modality, including DTMF, voice, and chat. The voice markup can also be directly conveyed to conversion engine 322, where it is converted to text presentable in interface 318.

The IVR application 342 can present a series of prompts to a user and can receive and process prompt responses in accordance with previously established dialogue menus. Speech processing operations, such as text-to-speech operations, speech-to-text operations, caller identification operations, and voice authorization operations can be provided by a remotely located voice server 330. Without the intervention of Chatbot server 320, IVR application 342 would be unable to interact with a text exchange device 312, since it lacks native coding for handling text exchange input/output.

The present invention may be realized in hardware, software, or a combination of hardware and software. The present invention may be realized in a centralized fashion in one computer system, or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation: b) reproduction in a different material form.

What is claimed is:

1. A method comprising acts of:
identifying a translation table that includes a plurality of entries, each entry including a text exchange item and a corresponding conversational item;
receiving an automatic output message, wherein the automatic output message was generated by a speech enabled application in response to a text exchange message that was entered into a text exchange client;
detecting at least one conversational item in the automatic output message, which corresponds to an entry included in the translation table;
in the automatic output message, substituting a corresponding text exchange item for the at least one detected conversational item to create a substitute output message, wherein the corresponding text exchange item comprises at least one letter and/or at least one emoticon; and
sending the substitute output message to the text exchange client.

2. The method of claim 1 wherein a user of the text exchange client is permitted to modify entries of the translation table.

3. The method of claim 1, wherein the text exchange item of at least one entry in the translation table is an emoticon.

4. The method of claim 1, wherein the text exchange item of at least one entry in the translation table is slang.

5. The method of claim 1, wherein the text exchange client is an instant messaging interface, a chat interface, and/or a text-messaging exchange interface.

6. The method of claim 1, wherein the speech enabled application is a VoiceXML based application that lacks an inherent text exchange capability.

7. The method of claim 1, wherein the text exchange client is an off-the-shelf unmodified interface, and wherein the speech enabled application is an unmodified application configured to execute in a VoiceXML server.

8. The method of claim 1, further comprising acts of:
receiving the text exchange message from the at least one text exchange client;
detecting at least one text exchange item in the text exchange message, which corresponds to an entry included in the translation table;
in the text exchange message, substituting a corresponding conversational item for the at least one detected text exchange item; and
sending the substitute text exchange message to a voice server.

9. The method of claim 1, wherein said acts of claim 1 are acts performed automatically by at least one machine in accordance with at least one computer program having a plurality of code sections that are executable by the at least one machine.

10. A method for extending a voice server to add text exchange capabilities, the method comprising acts of:
during an interactive dialogue between a text exchange client and a speech enabled application executing on a VoiceXML server, dynamically translating output text that is automatically generated in response to text received from the text exchange client and is grammatically part of a conversational language into corresponding text that is grammatically part of a text exchange specific language, wherein the corresponding text comprises at least one letter and/or at least one emoticon; and
sending the translated output text to the text exchange client.

11. The method of claim 10, further comprising:
dynamically translating text received from the text exchange client that is grammatically part of a text exchange specific language into translated received text that is grammatically part of a conversational language; and
sending the translated received text to a voice server.

12. The method of claim 10, wherein the text exchange specific language includes emoticons.

13. The method of claim 10, wherein the text exchange specific language includes text exchange slang.

14. The method of claim 10, wherein the text output is dynamically translated into corresponding output text using a user configurable translation table.

15. The method of claim 10, wherein the act of dynamically translating occurs in a manner transparent to the text exchange client and to the speech application.

16. The method of claim 10, wherein the text exchange client is an off-the-shelf unmodified client, and wherein the speech enabled application is an unmodified application configured to execute on the VoiceXML server.

17. The method of claim 10, wherein the speech enabled application is a VoiceXML based application that lacks an inherent text exchange capability.

18. The method of claim 10, wherein said acts of claim 10 are acts performed automatically by at least one machine in accordance with at least one computer program having a plurality of code sections that are executable by the at least one machine.

19. A system for providing text exchange services, the system comprising:
a text exchange client configured to send and receive real-time text exchanges over a text exchange channel;
a speech application environment configured to execute an automated speech response application that permits users to interact in real-time over a voice channel;
a Chatbot server configured to establish a communication session involving the text exchange client and the automated speech response application; and
a dialect translator configured to dynamically detect conversational language contained in messages automatically generated by the automated speech response application in response to messages received from the text exchange client, and to translate the conversational language into corresponding text exchange specific language, wherein at least some of the translated messages are received by the text exchange client and comprise at least one letter and/or at least one emoticon.

20. The system of claim 19, wherein the text exchange client is an off-the-shelf unmodified client, and wherein the automated speech response application is an unmodified VoiceXML based application that lacks an inherent text exchange capability.

21. The system of claim 19, wherein the dialect translator uses a user configurable translation table to convert the conversational language into the corresponding text exchange specific language.

* * * * *